(12) United States Patent
Ling et al.

(10) Patent No.: US 11,748,314 B2
(45) Date of Patent: Sep. 5, 2023

(54) METHOD, DEVICE AND COMPUTER PROGRAM PRODUCT FOR DATA REPLICATION

(71) Applicant: EMC IP Holding Company LLC, Hopkinton, MA (US)

(72) Inventors: Qing Hua Ling, Beijing (CN); Xin Zhong, Beijing (CN); Yangfeng Chen, Beijing (CN); Yue Yang, Beijing (CN); Jianbao Li, Beijing (CN); Lei Han, Beijing (CN); Yuan Gu, Beijing (CN); Yan Shao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 737 days.

(21) Appl. No.: 16/227,700

(22) Filed: Dec. 20, 2018

(65) Prior Publication Data
US 2019/0332580 A1    Oct. 31, 2019

(30) Foreign Application Priority Data
Apr. 28, 2018    (CN) .......................... 201810399820.0

(51) Int. Cl.
*G06F 16/178*    (2019.01)
*G06F 9/4401*    (2018.01)

(52) U.S. Cl.
CPC .......... *G06F 16/178* (2019.01); *G06F 9/4401* (2013.01)

(58) Field of Classification Search
None
See application file for complete search history.

(56) References Cited

U.S. PATENT DOCUMENTS

| | | | |
|---|---|---|---|
| 8,725,691 B1 * | 5/2014 | Natanzon | G06F 11/1464 707/640 |
| 8,832,498 B1 | 9/2014 | Jain et al. | |
| 8,972,405 B1 | 3/2015 | Chaulk et al. | |
| 9,158,540 B1 | 10/2015 | Tzelnic et al. | |
| 9,286,261 B1 | 3/2016 | Tzelnic et al. | |
| 9,652,568 B1 | 5/2017 | Tzelnic et al. | |
| 9,658,797 B1 | 5/2017 | Elliott, IV et al. | |
| 9,736,046 B1 | 8/2017 | Jain et al. | |
| 9,959,061 B1 | 5/2018 | Natanzon et al. | |
| 10,120,925 B1 | 11/2018 | Natanzon et al. | |
| 10,191,958 B1 | 1/2019 | Elliott, IV et al. | |

(Continued)

FOREIGN PATENT DOCUMENTS

CN    104272274    1/2015

*Primary Examiner* — Yu Zhao
(74) *Attorney, Agent, or Firm* — BainwoodHuang (57) ABSTRACT

Techniques for data replication involve: in response to a first source state machine associated with a source file system being booted up, booting up a second source state machine associated with the source file system, the first source state machine performing a first operation for resizing a first storage area of data for replication from the source file system; transmitting a resizing message from the second source state machine to a destination file system, to enable the destination file system to perform a second operation for resizing a second storage area for storing the data to be replicated into the destination file system; and in response to the first operation and the second operation being successfully performed, enabling the data for replication from the source file system to be replicated into the destination file system.

8 Claims, 6 Drawing Sheets

(56) References Cited

U.S. PATENT DOCUMENTS

| | | | |
|---|---|---|---|
| 10,241,712 B1 | 3/2019 | Elliott, IV et al. | |
| 10,528,262 B1 | 1/2020 | Shmuylovich et al. | |
| 10,534,629 B1 | 1/2020 | St et al. | |
| 2014/0208091 A1* | 7/2014 | Koning | G06F 11/1433 |
| | | | 713/2 |
| 2016/0085606 A1* | 3/2016 | Panasko | G06F 11/2097 |
| | | | 714/37 |
| 2016/0110170 A1* | 4/2016 | Miller | G06F 8/4443 |
| | | | 717/151 |

* cited by examiner

METHOD, DEVICE AND COMPUTER PROGRAM PRODUCT FOR DATA REPLICATION

FIELD

The present disclosure generally relates to the field of data replication, and more specifically, to a method, device and computer program product for data replication.

BACKGROUND

In a data storage system, it is possible to store a plurality of backups of data simultaneously to improve data security and availability. For example, data may be replicated from one storage device to another through mirrored view technology. Synchronous replication is a technology in which the network-attached storage (NAS) generates multiple data synchronous copies by means of block replication technology. Any writing operation on the source file system will result in two writes, one is to write into the source file system and the other is to write into the destination file system. The file system will only consider the write completed if it receives two responses. The advantage of synchronous replication is that delay of data synchronous protection is small and that the restoration point object (RPO) is equal to 0. Therefore, in the event of disaster event in the production data center, no data loss will occur.

However, most of the current file systems utilize thin provisioning. In other words, the size of the storage area of the user data in the file system will be expanded or shrinked automatically as the user data is used. Once the sizes of the storage areas of the source file system and the destination file system are not matched, IO failure might occur.

SUMMARY

Embodiments of the present disclosure provide a method, device and computer program product for data replication.

In a first aspect of the present disclosure, there is provided a method of data replication. The method may include: in response to a first source state machine associated with a source file system being booted up, booting up a second source state machine associated with the source file system, the first source state machine performing a first operation for resizing a first storage area of data for replication from the source file system; transmitting a resizing message from the second source state machine to a destination file system, to enable the destination file system to perform a second operation for resizing a second storage area for storing the data to be replicated into the destination file system; and in response to the first operation and the second operation being successfully performed, enabling the data for replication from the source file system to be replicated into the destination file system.

In some embodiments, the method may further include: obtaining, at the second source state machine, an execution result of the first operation from the first source state machine; and obtaining, at the second source state machine, an execution result of the second operation from the destination file system.

In some embodiments, in response to the first operation and the second operation being successfully performed, enabling the data for replication from the source file system to be replicated into the destination file system may include: transmitting, from the second source state machine, a message that the first operation has been successfully performed to the destination file system to enable the data to be replicated are replicated into the second storage area in the destination file system.

In some embodiments, the method may further include: in response to the first operation or the second operation being failed, performing a rollback operation at the first source state machine.

In some embodiments, the method may further include: receiving, from the destination file system, a message indicating that the second operation has been successfully performed.

In some embodiments, the method may further include: transmitting, to the destination file system, a message indicating that the first operation has been successfully performed.

In a second aspect of the present disclosure, there is provided a method of data replication. The method may include: in response to a resizing message from a source file system, booting up a first destination state machine associated with the destination file system, wherein the resizing message indicates that a first operation for resizing a first storage area of data for replication from the source file system is implemented; in response to the first destination state machine being booted up, booting up a second destination state machine associated with the destination file system, the second destination state machine performing a second operation for resizing a second storage area for storing the data to be replicated into the destination file system; and in response to the first operation and the second operation being successfully performed, replicating the data to be replicated.

In a third aspect of the present disclosure, there is provided an electronic device. The device may include: at least one processing unit; and at least one memory coupled to the at least one processing unit and storing machine-executable instructions, the instructions, when executed by the at least one processing unit, causing the electronic device to perform acts. The acts include: in response to a first source state machine associated with a source file system being booted up, booting up a second source state machine associated with the source file system, the first source state machine performing a first operation for resizing a first storage area of data for replication in the source file system; transmitting a resizing message from the second source state machine to a destination file system, to enable the destination file system to perform a second operation for resizing a second storage area for storing the data to be replicated into the destination file system; and in response to the first operation and the second operation being successfully performed, enabling the data for replication from the source file system to be replicated into the destination file system.

In a fourth aspect of the present disclosure, there is provided an electronic device. The device may include: at least one processing unit; and at least one memory coupled to the at least one processing unit and storing machine-executable instructions, the instructions, when executed by the at least one processing unit, causing the electronic device to perform acts. The acts include: in response to a resizing message from a source file system, booting up a first destination state machine associated with the destination file system, wherein the resizing message indicates that a first operation for resizing a first storage area of data for replication from the source file system is implemented; in response to the first destination state machine being booted up, booting up a second destination state machine associated with the destination file system, the second destination state machine performing a second operation for resizing a second storage area for storing the data to be replicated into the destination file system; and in response to the first operation and the second operation being successfully performed, replicating the data to be replicated.

In a fifth aspect of the present disclosure, there is provided a computer program product tangibly stored on a non-transient computer readable medium and including machine executable instructions which, when executed, cause the machine to perform steps of the method according to the first aspect or second aspect.

This Summary is provided to introduce a selection of concepts that are further described below in the Detailed Description in a simplified form. This Summary is not intended to identify key features or essential features of the present disclosure, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference symbols usually refer to the same components.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in greater detail with reference to the drawings. Although the drawings present the preferred embodiments of the present disclosure, it should be understood that the present disclosure can be implemented in various ways and should not be limited by the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

Figure 1:
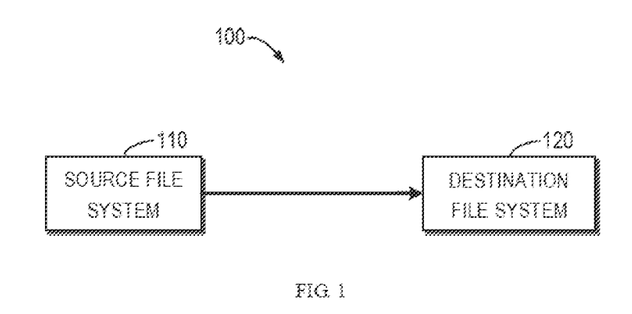
FIG. 1 illustrates a schematic diagram of an overall arrangement of a data replication system.

A file system generally has thin provisioning, which can be allocated with a small lower deck logic unit number device (LUN) or other storage resources while generally with larger storage resources on the upper deck. The size of storage resources of user data in the file system will change automatically, for example, expand or shrink, along with usage of user data. Therefore, in order to ensure that the destination file system side of the mirror IO has sufficient storage space, it is necessary to make sure that the size of the lower deck LUN of the destination file system is matched with the size of the source file system side. That is, the change of the size of the storage area of the source file system should be synchronized into the destination file system. FIG. 1 is illustrates schematic diagram of an overall arrangement of a data replication system 100. As shown in FIG. 1, the data replication system 100 includes a source file system 110 and a destination file system 120.

Under the synchronous replication environment, any change on the source file system 110 should be synchronized to the destination file system 120, including host IO and size change of the storage area. On EMC product Unity, synchronous replication at the block level has already been able to support synchronization of each IO at the source file system 110 side to the destination file system 120. However, there does not exist any related technology enabling the operation of synchronizing the changes of storage size.

In the face of the above problem, the technician usually uses the existing interfaces to resize the corresponding storage area of the destination file system when the size of the storage area of user data in the source file system changes. However, since there is a possibility of operation failure at both sides, it may be necessary to call the resizing operation several times to handle the rollback and it is impossible to control the resizing operation in detail. Moreover, if the operation of adjusting the storage size is completed on the source file system side, and the IO boots up immediately for data replication, once the destination file system side does not complete the adjustment of the storage size in time, there will be a window of size inconsistency, which causes IO failure.

Figure 2:
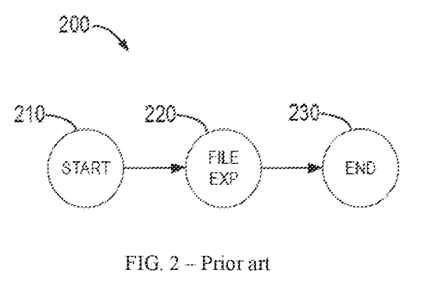
FIG. 2 illustrates a schematic diagram of a state machine with traditional storage size expansion.

For the adjustment of the storage size, taking expansion as an example, FIG. 2 illustrates a schematic diagram of a state machine 200 with traditional storage size expansion. In FIG. 2, the states of the state machine 200 may be summarized as three, namely, start state 210, file expansion state 220 and end state 230. In the start state 210, an operation such as initialization is generally performed. In the end state, operations such as notification after the completion of expansion operation, updating and rollback after failure of expansion and the like are generally performed. Thus, it can be seen that the key state in the state machine 200 is file expansion state 220. However, the respective state machines of the traditional source file system 110 and the destination file system 120 do not communicate with each other and therefore, the state machines on two sides cannot learn if the opposite one successfully performs the expansion operation. This is the main reason why the change of the size of the storage area of the source file system 110 cannot be synchronized to the destination file system 120.

To at least partly solve the above and other potential problems and defects, embodiments of the present disclosure provide a scheme for data replication. For the above problem, the following improvements are made to the scheme for data replication of the present disclosure: in order to avoid IO failure caused by inconsistency in size change between both sides of the source file system 110 and the destination file system 120, it is possible to create a state machine having a communication function respectively on both sides of the source file system 110 and the destination file system 120 and use the newly created state machines to obtain the completion of size change operations on both sides. The data replication operation may be further performed only when the size changes on both sides are completed. Moreover, other advantages may be provided as a result of the creation of a new state machine, which will be depicted in detail below in connection with specific technical solutions.

Figure 3:
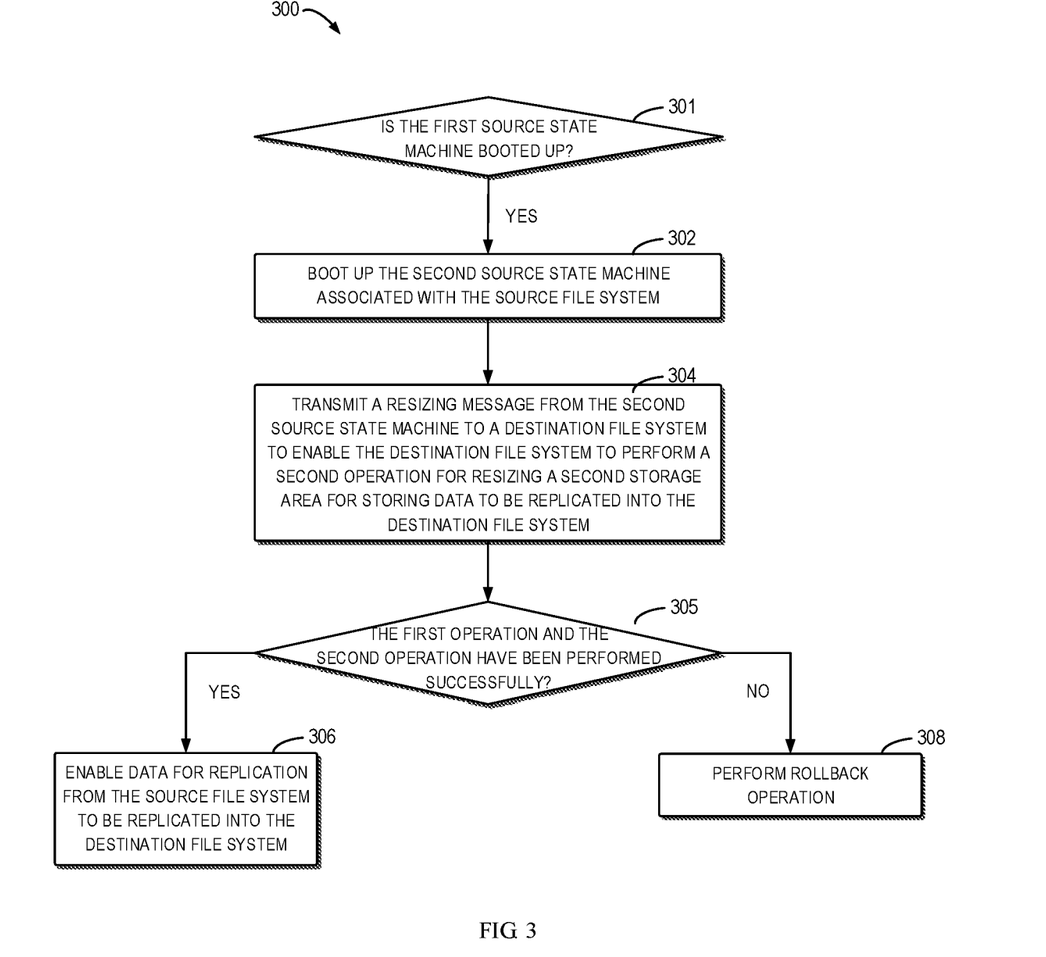
FIG. 3 illustrates a flowchart of a process or method for data replication in accordance with embodiments of the present disclosure.

FIG. 3 illustrates a flowchart of a process or method 300 for data replication in accordance with embodiments of the present disclosure. In some embodiments, method 300 may be implemented in the device shown in FIG. 7. As an example, method 300 may be implemented in the source file system 110 shown in FIG. 1. Now, reference is made to FIG. 1 to depict the process or method 300 for data replication in accordance with embodiments of the present disclosure shown in FIG. 3. For ease of understanding, the specific data mentioned below are all illustrative, rather than for limiting the scope of the present disclosure.

At 301, it is determined if the first source state machine is booted up. When the first source state machine is booted up, then proceed to 302. At 302, a second source state machine associated with the source file system 110 is booted up and the first source state machine performs a first operation for resizing the first storage area of data for replication from the source file system 110. In some embodiments, the first source state machine is provided in an orchestrating component in the source file system 110 while the second source state machine is created in a business logic object (BLO) component in the source file system 110. In some embodiments, the first operation to resize the first storage area of data for replication from the source file system 110 may be an operation of expanding or shrinking the size of the first storage area of data for replication from the source file system 110. As the second source state machine is created in the BLO component, the second source state machine has a function of communicating with the BLO component in the destination file system 120, thereby realizing communication between the source file system 110 side and the destination file system 120 side.

At 304, a resizing message is transmitted from the second source state machine to the destination file system 120 so that the destination file system 120 performs a second operation for resizing the second storage area in the destination file system 120. The second storage area is used for storing data to be replicated. In some embodiments, the second source state machine may be created in the business logic object (BLO) component in the source file system 110, thereby realizing communication between the source file system 110 and the destination file system 120.

At 305, it is determined if the first operation and the second operation are successfully performed. When both operations are successfully performed, proceed to 306. In 306, data for replication from the source file system 110 are replicated into the destination file system 120. In some embodiments, the execution result of the first operation may be obtained at the second source state machine from the first source state machine, and the execution result of the second operation may be obtained at the second source state machine from the destination file system 120. That is, the execution results of the first operation and the second operation may be collected at the second source state machine at the source file system 110 side and share the result to the destination file system 120 side. As both the source file system 110 and the destination file system 120 can obtain information that the first operation and the second operation are successfully performed, normal IO can be ensured to realize synchronous replication.

In some embodiments, it is possible to transmit a message that first operation has been succeeded to the destination file system 120 from the second source state machine so that data to be replicated are replicated into a second storage area of the destination file system 120. That is, as the destination file system 120 side may learn the completion condition of its own second operation, when the destination file system 120 further learns the completion condition of the first operation of the source file system 110 side, normal IO can be ensured to realize synchronous replication.

In some embodiments, when at least one of the first operation and the second operation fails, proceed to 308. At 308, rollback operation may be performed at the first source state machine. Therefore, the data replication method of the present disclosure may be easily restored to the initial state before the expansion operation, avoiding the need to perform, for instance, a shrinking operation opposite to the expansion operation, during the conventional synchronous replication process.

In some embodiments, a message indicating that the second operation has been performed successfully may also be received from the destination file system 120.

In some embodiments, a message indicating that the first operation has been performed successfully may also be transmitted to the destination file system 120.

To illustrate the inventive idea of the present disclosure more clearly, reference will be made to FIGS. 4 and 5 below to depict the operation state of each state machine at the source file system 110 side and the destination file system 120 side during the data replication process in greater detail.

Figure 4:
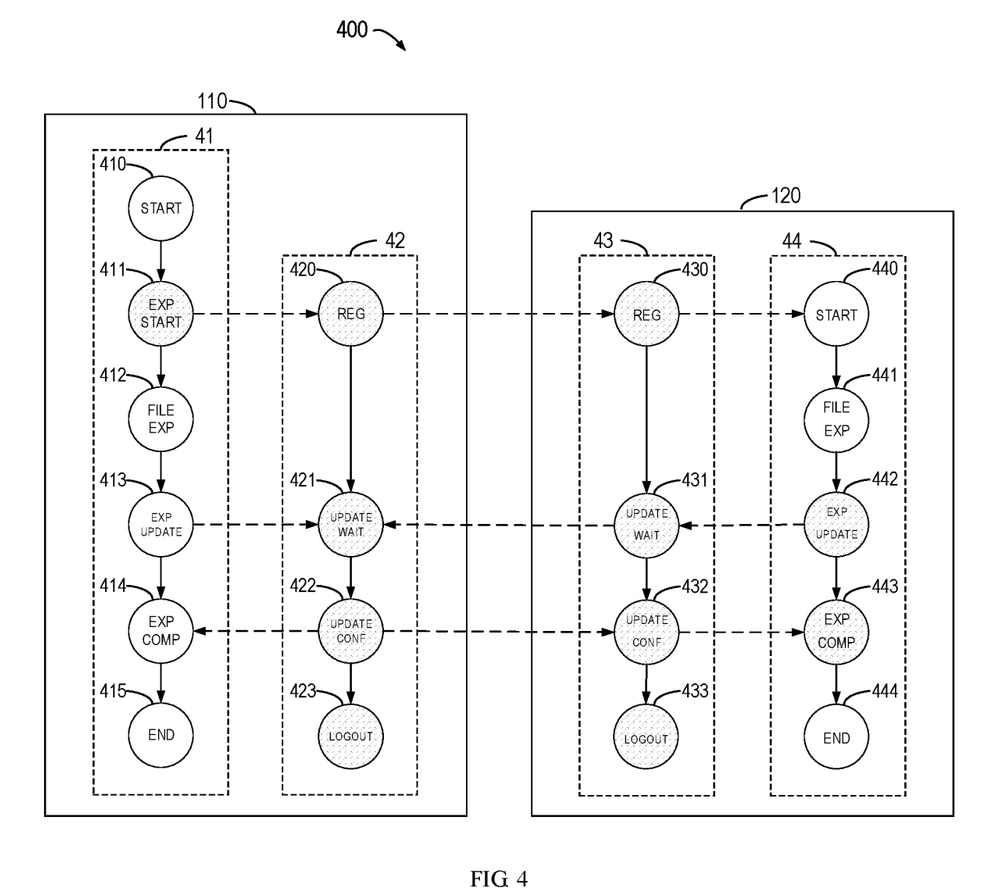
FIG. 4 illustrates a schematic diagram of a system for data replication in accordance with embodiments of the present disclosure.

FIG. 4 illustrates a schematic diagram of a system 400 for data replication in accordance with embodiments of the present disclosure. It is to be understood that FIG. 4 illustrates only one case for file expansion. As resizing of the storage area or file may also include the case of file size reduction, the condition of file size reduction should also be taken into account. As shown in FIG. 4, the system 400 includes a source file system 110 which may include a state machine 41 and a state machine 42 and a destination file system 120 which may include a state machine 43 and a state machine 44.

At the source file system 110 side, the state machine 41 may include a start state 410, an expansion start state 411, a file expansion state 412, an expansion updating state 413, an expansion completion state 414, and an end state 415. The state machine 42 may include a registering state 420, an update waiting state 421, an update confirming state 422, and a logout state 423. Through comparison with FIG. 2, it can be known that apart from the start state 410, the file expansion state 412 and the end state 415 (these states are not drawn with mesh shading), all the rest of the states (drawn with mesh shading) are newly created states. Unlike the state machine 41 created on the local orchestration (LO), the state machine 42 is preferably created on the business logic object (BLO) to achieve communication function.

At the destination file system 120 side, the state machine 43 may include a registering state 430, an update waiting state 431, an update confirming state 432 and a logout state 433. The state machine 44 may include a start state 440, a file expansion state 441, an expansion updating state 442, an expansion completion state 443, and end state 444. Through comparison with FIG. 2, it can be known that apart from the start state 440, the file expansion state 441 and the end state 444 (these states are not drawn with mesh shading), all the rest of the states (drawn with mesh shading) are newly created states. Unlike the state machine 44 created on the local orchestration (LO), the state machine 43 is preferably created on the business logic object (BLO) to achieve communication function.

In the system 400, in response to a particular request (such as user request), the state machine 41 boots up so as to enter the start state 410. Then, the state machine 41 enters the expansion start state 411. At the expansion start state 411, the state machine 41 begins to call the state machine 42 in the BLO component. Therefore, while the state machine 41 enters the file expansion state 412, the state machine 42 may notify the message that the expansion starts to the destination file system 120 side. When the destination file system 120 receives the message, the state machine 43 in the BLO component boots up to further boot up the state machine 44. Then, the state machine 42 and the state machine 43 for communication enter the registering state 420 and registering state 430, respectively, and the state machine 44 enters the file expansion state 441 correspondingly. By means of the above operation, the source file system 110 and the destination file system 120 may enter the file expansion state almost simultaneously and perform the expansion operation specifically.

Subsequently, the state machine 42 and the state machine 43 may enter the update waiting states 421 and 431, respectively, to wait for the result of the expansion operation. When the file expansion operation is completed, the state machine 41 enters, from the file expansion state 412, the expansion updating state 413 which is mainly for recording the expansion result. As an example, the expansion result may include expansion success and expansion failure. Then, the state machine 41 transmits, at the expansion updating state 413, the expansion result to the update waiting state 421 of the state machine 42. In addition to waiting for the expansion result of the source file system 110 side, the update waiting state 421 further waits for the expansion result of the destination file system 120 side. In particular, after the concurrent expansion operation of the destination file system 120 is completed, the state machine 44 enters, from the file expansion state 441, the expansion updating state 442 which is mainly used for recording the expansion result. Then, the state machine 44 transmits, at the expansion updating state 442, the expansion result to the update waiting state 431 of the state machine 43, and the state machine 43 transmits, at the update waiting state 431, the expansion result of the destination file system 120 side to the update waiting state 421 of the state machine 42. That is, the file expansion results of two sides may be summarized at the state machine 42 of the source file system 110 side.

Subsequently, only when the expansion results of the source file system 110 side and the destination file system 120 side both are success, the state machine 42 enters the update confirming state 422. Then, the state machine 42 feeds the confirmation that expansion at both sides is completed back to the state machine 41 to cause it to enter expansion completion state 414. At the same time, the state machine 42 enters the logout state 423, and the state machine 41 also enters the end state 415.

Corresponding to the source file system 110 side, the state machine 43 at the destination file system 120 side, after receiving the confirmation that expansion operations at both sides are completed from the state machine 42, enters the update confirming state 432, and then the state machine 44 also enters the expansion completion state 443. Simultaneously, the state machine 43 enters the logout state 433, and the state machine 44 also enters the end state 444.

By creating a state machine having a communication function at both the source file system 110 side and destination file system 120 side (the state machine 42 and state machine 43 shown in FIG. 4) respectively and obtaining the completion condition of the resizing operation at two sides with the newly created state machines, the IO failure caused by inconsistent resizing operations at the source file system 110 side and destination file system 120 side can be avoided. Besides, since the state machine 42 and state machine 43 are both created on the BLO, these state machines may be processed with priority by operations such as registration and logout, etc., thereby avoiding mutual repulsion of replication operations (such as stop, resume and so on) running on the replication session object in Dart component. Moreover, the new state machine mechanism simplifies the rollback operation in the event of a failure.

As a matter of course, apart from implementing summarization of file expansion results of both sides at the state machine 42 of the source file system 110 side shown in FIG. 4, it is also possible to achieve summary of file expansion results of two sides at the state machine 43 at the destination file system 120 side, which will be described below in detail with reference to FIG. 5.

Figure 5:
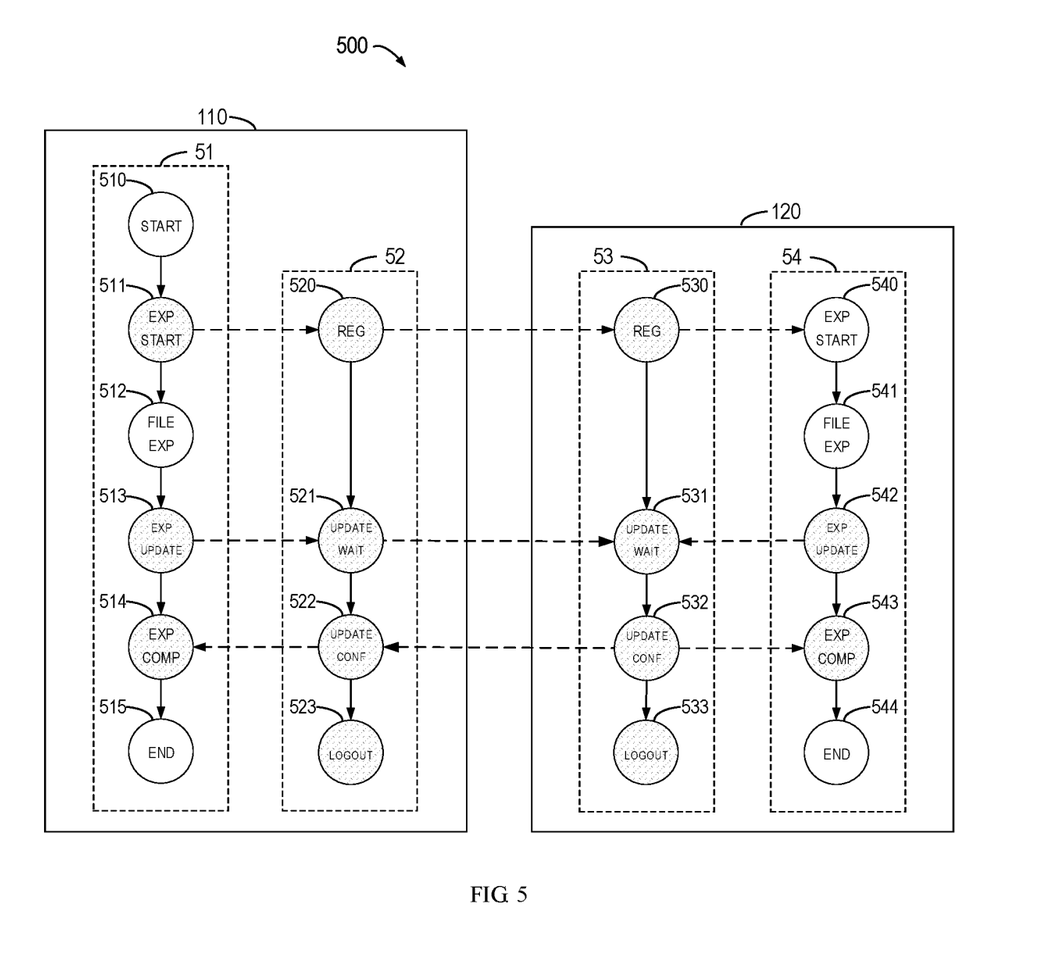
FIG. 5 illustrates a schematic diagram of a system for data replication in accordance with embodiments of the present disclosure.

FIG. 5 illustrates a schematic diagram of a system 500 for data replication in accordance with embodiments of the present disclosure. It is to be noted that FIG. 5 only differs from FIG. 4 in the update waiting states 521 and 531 and the update conforming states 522 and 532. Therefore, these processes will be described below in detail. Since the rest of the parts are the same as FIG. 4, these parts will be omitted.

As shown in FIG. 5, the state machine 51 transmits, at the expansion updating state 513, the expansion result to the update waiting state 521 of the state machine 52. Likewise, the state machine 54 transmits, at the expansion updating state 542, the expansion result to the update waiting state 531 of the state machine 53. In addition to waiting for the expansion result of the destination file system 120 side, the update waiting state 531 further waits for the expansion result at the source file system 110 side. That is, the file expansion results of two sides may be summarized at the state machine 53 of the destination file system 120 side.

Subsequently, only when the expansion results of the source file system 110 side and the destination file system 120 side are both success, the state machine 53 enters the update confirming state 532. Then, the state machine 53 feeds the confirmation that expansion at both sides is completed back to the state machine 54 to cause it to enter the expansion completion state 543. At the same time, the state machine 53 enters the logout state 533, and the state machine 54 also enters the end state 544.

Corresponding to the destination file system 120 side, after receiving a confirmation that expansion operations at both sides are completed from the state machine 53, the state machine 52 at the source file system 110 side enters the update confirming state 522, and then the state machine 51 also enters the expansion completion state 514. Simultaneously, the state machine 52 enters the logout state 523, and the state machine 51 also enters the end state 515.

Figure 6:
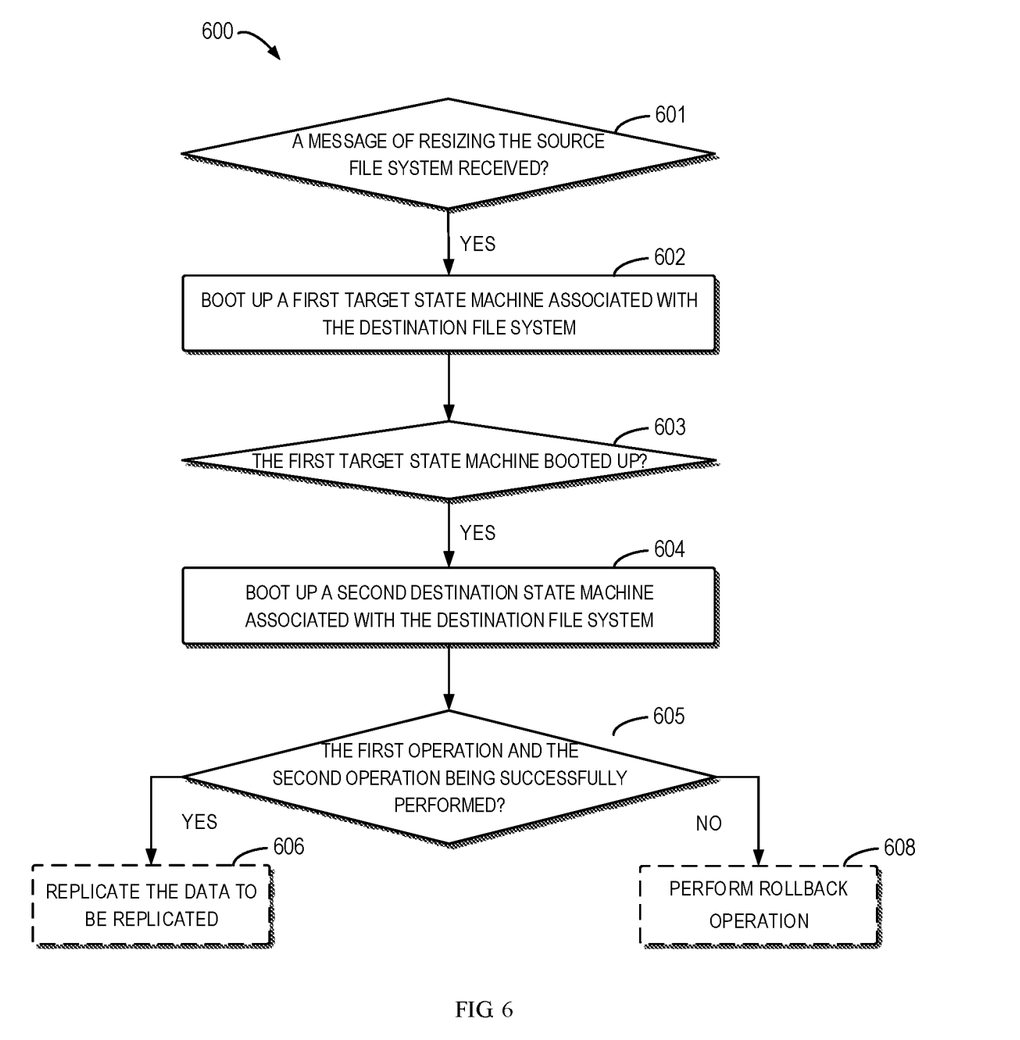
FIG. 6 illustrates a flowchart of a process or method for data replication in accordance with embodiments of the present disclosure.

FIG. 6 illustrates a flowchart of a process or method 600 for data replication in accordance with embodiments of the present disclosure. In some embodiments, the method 600 may be implemented in the device shown in FIG. 7. As an example, the method 600 may be implemented in the destination file system 120 shown in FIG. 1. Now, reference is made to FIG. 1 to depict the process or method 600 for data replication according to embodiments of the present disclosure shown in FIG. 6. For ease of understanding, the specific data mentioned in the following depiction are all illustrative, rather than for limiting the scope of the present disclosure.

At 601, it is determined if a message of resizing the source file system is received. When the resizing message is received, proceed to 602. At 602, a first destination state machine associated with the destination file system 120 is booted up. The resizing message indicates that the first operation for resizing the first storage area of data for replication from the source file system 110 is implemented. In some embodiments, the first destination state machine is created in the business logic object (BLO) component in the destination file system 120. In some embodiments, the first operation to resize the first storage area of data for replication from the source file system 110 may be an operation of expanding or shrinking the size of the first storage area of data for replication from the source file system 110. As the first destination state machine is created in the BLO component, the first destination state has a function of communicating with the BLO component in the source file system 110, thereby realizing communication between the source file system 110 side and the destination file system 120 side.

At 603, it is determined if the first destination state machine is booted up. When the first destination state machine is booted up, proceed to 604. At 604, a second destination state machine associated with the destination file system 120 is booted up. The second destination state machine performs a second operation for resizing the second storage area for storing data to be replicated in the destination file system 120. In some embodiments, the second destination state machine is arranged in an orchestrating component in the destination file system 120. In some embodiments, the second operation for resizing the second storage area for storing data to be replicated in the destination file system 120 may be an operation of expanding or shrinking the size of the storage area.

At 605, it is determined if the first operation and second operation are performed successfully. When both the first operation and second operation are performed successfully, proceed to 606. At 606, the data to be replicated are replicated. In some embodiments, the execution result of the first operation may be obtained at the first destination state machine from the source file system, and the execution result of the second operation may be obtained at the first destination state machine from the second destination state machine. That is, the execution results of the first operation and the second operation may be summarized at the first destination state machine of the destination file system 120 side and shared to the source file system 110 side. As both the source file system 110 and the destination file system 120 may obtain information that first operation and the second operation are performed successfully, normal IO can be ensured to realize synchronous replication. In some embodiments, when at least one of the first operation and the second operation fails, proceed to 608. At 608, rollback operation may be performed at the first source state machine.

In some embodiments, when the first destination state machine receives a message that the first operation has been performed successfully from the source file system 110, the data to be replicated are replicated to the second storage area in the destination file system 120.

In some embodiments, a message indicating that the first operation has been performed successfully may be received from the source file system 110.

In some embodiments, a message indicating that the second operation has been performed successfully may be transmitted to the source file system 110.

Figure 7:
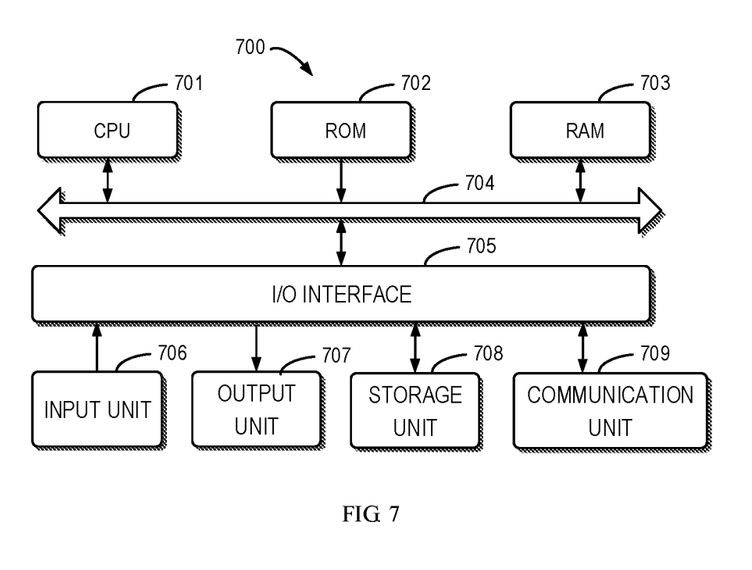
FIG. 7 illustrates a schematic block diagram of a device for data replication in accordance with embodiments of the present disclosure.

FIG. 7 illustrates a schematic block diagram of an example device 700 that may be used to implement embodiments of the present disclosure. As illustrated, the device 700 includes a central processing unit (CPU) 701 which may perform various appropriate actions and processing according to the computer program instructions stored in a read-only memory (ROM) 702 or the computer program instructions loaded from a storage unit 708 into a random access memory (RAM) 703. The RAM 703 also stores all kinds of programs and data required by operating the storage device 700. CPU 701, ROM 702 and RAM 703 are connected to each other via a bus 704, to which an input/output (I/O) interface 705 is also connected.

A plurality of components in the device 700 are connected to the I/O interface 705, including: an input unit 706, such as keyboard, mouse and the like; an output unit 707, such as various types of display, loudspeakers and the like; a storage unit 708, such as magnetic disk, optical disk and the like; and a communication unit 709, such as network card, modem, wireless communication transceiver and the like. The communication unit 709 allows the device 700 to exchange information/data with other devices through computer networks such as Internet and/or various telecommunication networks.

Each procedure and processing described above, such as method 300 and/or 600, may be executed by a processing unit 701. As an example, in some embodiments, the method 300 and/or 600 may be implemented as computer software programs, which are tangibly included in a machine-readable medium, such as storage unit 708. In some embodiments, the computer program may be partially or completely loaded and/or installed to the device 700 via ROM 702 and/or the communication unit 709. When the computer program is loaded to RAM 703 and executed by CPU 701, one or more acts of the above described method 300 and/or 600 are implemented.

The present disclosure may be a method, an apparatus, a system and/or a computer program product. The computer program product can include a computer-readable storage medium loaded with computer-readable program instructions thereon for executing various aspects of the present disclosure.

The computer readable storage medium may be a tangible device capable of holding and storing instructions used by an instruction execution device. The computer readable storage medium may be, but is not limited to, for example, electronic storage devices, magnetic storage devices, optical storage devices, electromagnetic storage devices, semiconductor storage devices, or any random appropriate combination thereof. More specific examples (non-exhaustive list) of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as a punched card storing instructions or an emboss within a groove, and any random suitable combination thereof. A computer readable storage medium used herein is not interpreted as a transitory signals per se, such as radio waves or other freely propagated electromagnetic waves, electromagnetic waves propagated through a waveguide or other transmission medium (e.g., optical pulses passing through fiber-optic cables), or electrical signals transmitted through electric wires.

The computer readable program instructions described herein may be downloaded from a computer readable storage medium to various computing/processing devices, or to external computers or external storage devices via a network, for example, the Internet, a local area network, a wide area network and/or a wireless network. The network may include copper transmission cables, optical fiber transmission, wireless transmission, routers, firewalls, switches, gateway computers and/or edge servers. The network adapter or network interface in each computing/processing device receives computer readable program instructions from the network and forwards the computer readable program instructions for storage in a computer readable storage medium of each computing/processing device.

Computer readable program instructions for executing the operations of the present disclosure may be assembly instructions, instructions of instruction set architecture (ISA), machine instructions, machine dependent instructions, microcode, firmware instructions, state setting data, or either source code or destination code written by any combination of one or more programming languages including object oriented programming languages, such as Smalltalk, C++ or the like, and conventional procedural programming languages, such as the "C" programming language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagrams of method, apparatus (systems), and computer program product according to embodiments of the present disclosure. It will be understood that each block in the flow chart and/or block diagrams, and any combinations of various blocks thereof may be implemented by computer readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may include a manufactured article that includes instructions for implementing various aspects of the functions/actions specified in one or more blocks of the flow chart and/or block diagram.

The computer readable program instructions may also be loaded into computers, other programmable data processing devices, or other devices, so as to execute a series of operational steps on the computer, other programmable data processing devices or other devices to generate a computer implemented process. Therefore, the instructions executed on the computer, other programmable data processing devices, or other device may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of data replication, comprising:
   in response to a first source state machine associated with a source file system being booted up, booting up a second source state machine associated with the source file system, the first source state machine having a first plurality of states including at least a file expansion state and an expansion update state, the second source state machine having a second plurality of states including at least an update wait state and an update confirm state;

performing a first operation by the file expansion state of the first source state machine, the first operation including expanding a first storage area of first data for replication from the source file system;

transmitting an expanding message from the second source state machine to a destination file system, a second operation being performed by the destination file system in response to the expanding message being transmitted to the destination file system, the second operation including expanding a second storage area for storing the first data to be replicated into the destination file system;

receiving, at the update wait state of the second source state machine, a first execution result of the first operation from the expansion update state of the first source state machine, the first execution result indicating that the first storage area was successfully expanded in response to the first operation being performed;

receiving, at the update wait state of the second source state machine, a second execution result of the second operation directly from the destination file system, the second execution result indicating that the second storage area was successfully expanded in response to the second operation being performed;

determining, by the update wait state of the second source state machine, that the first storage area and the second storage area were successfully expanded based on the first execution result and the second execution result, respectively;

transmitting first information from the update confirm state of the second source state machine to the destination file system, the first information indicating that the first storage area and the second storage area were successfully expanded; and in response to the first information being transmitted from the second source state machine to the destination file system, replicating the first data from the source file system into the destination file system.

2. The method according to claim 1, wherein transmitting the first information to the destination file system comprises:
transmitting, from the update confirm state of the second source state machine, a message indicating that the first storage area has been successfully expanded to the destination file system to enable the first data to be replicated into the expanded second storage area in the destination file system.

3. The method according to claim 1, further comprising:
in response to the first storage area or the second storage area not being successfully expanded, performing a rollback operation at the first source state machine.

4. The method according to claim 1, further comprising:
performing a third operation by the first source state machine, the third operation including shrinking a third storage area of second data for replication from the source file system;

transmitting a shrinking message from the second source state machine to the destination file system, a fourth operation being performed by the destination file system in response to the shrinking message being transmitted to the destination file system, the fourth operation including shrinking a fourth storage area for storing the second data to be replicated into the destination file system;

receiving, at the update wait state of the second source state machine, a third execution result of the third operation from the first source state machine, the third execution result indicating that the third storage area was successfully shrunk in response to the third operation being performed;

receiving, at the update wait state of the second source state machine, a fourth execution result of the fourth operation directly from the destination file system, the fourth execution result indicating that the fourth storage area was successfully shrunk in response to the fourth operation being performed;

determining, by the update wait state of the second source state machine, that the third storage area and the fourth storage area were successfully shrunk based on the third execution result and the fourth execution result, respectively;

transmitting, second information from the update confirm state of the second source state machine to the destination file system, the second information indicating that the third storage area and the fourth storage area were successfully shrunk; and in response to the second information being transmitted from the second source state machine to the destination file system, replicating the second data from the source file system into the destination file system.

5. An electronic device, comprising:
at least one processing unit; and
at least one memory coupled to the at least one processing unit and storing machine-executable instructions, the instructions, when executed by the at least one processing unit, causing the electronic device to perform acts, comprising:

in response to a first source state machine associated with a source file system being booted up, booting up a second source state machine associated with the source file system, the first source state machine having a first plurality of states including at least a file expansion state and an expansion update state, the second source state machine having a second plurality of states including at least an update wait state and an update confirm state;

performing a first operation by the file expansion state of the first source state machine, the first operation including expanding a first storage area of first data for replication in the source file system;

transmitting an expanding message from the second source state machine to a destination file system, a second operation being performed by the destination file system in response to the expanding message being transmitted to the destination file system, the second operation including expanding a second storage area for storing the first data to be replicated into the destination file system;

receiving, at the update wait state of the second source state machine, a first execution result of the first operation from the expansion update state of the first source state machine, the first execution result indicating that the first storage area was successfully expanded in response to the first operation being performed;

receiving, at the update wait state of the second source state machine, a second execution result of the second operation directly from the destination file system, the second execution result indicating that the second storage area was successfully expanded in response to the second operation being performed;

determining, by the update wait state of the second source state machine, that the first storage area and the second storage area were successfully expanded based on the first execution result and the second execution result, respectively;

transmitting first information from the update confirm state of the second source state machine to the destination file system, the first information indicating that the first storage area and the second storage area were successfully expanded; and in response to the first information being transmitted from the second source state machine to the destination file system, replicating the first data from the source file system into the destination file system.

6. The electronic device according to claim 5, wherein transmitting the first information to the destination file system comprises:

transmitting, from the update confirm state of the second source state machine, a message indicating that the first storage area has been successfully expanded to the destination file system to enable the first data to be replicated into the expanded second storage area in the destination file system.

7. The electronic device according to claim 5, wherein the acts further comprise:

in response to the first storage area or the second storage area not being successfully expanded, performing a rollback operation at the first source state machine.

8. A computer program product having a non-transitory computer readable medium which stores a set of instructions for carrying out data replication; the set of instructions, when carried out by computerized circuitry of the data storage system, causing the computerized circuitry to perform a method of:

in response to a first source state machine associated with a source file system being booted up, booting up a second source state machine associated with the source file system, the first source state machine having a first plurality of states including at least a file expansion state and an expansion update state, the second source state machine having a second plurality of states including at least an update wait state and an update confirm state;

performing a first operation by the file expansion state of the first source state machine, the first operation including expanding a first storage area of first data for replication from the source file system;

transmitting an expanding message from the second source state machine to a destination file system, a second operation being performed by the destination file system in response to the expanding message being transmitted to the destination file system, the second operation including expanding a second storage area for storing the data to be replicated into the destination file system;

receiving, at the update wait state of the second source state machine, a first execution result of the first operation from the expansion update state of the first source state machine, the first execution result indicating that the first storage area was successfully expanded in response to the first operation being performed;

receiving, at the update wait state of the second source state machine, a second execution result of the second operation directly from the destination file system, the second execution result indicating that the second storage area was successfully expanded in response to the second operation being performed;

determining, by the update wait state of the second source state machine, that the first storage area and the second storage area were successfully expanded based on the first execution result and the second execution result, respectively;

transmitting first information from the update confirm state of the second source state machine to the destination file system, the first information indicating that the first storage area and the second storage area were successfully expanded; and in response to the first information being transmitted from the second source state machine to the destination file system, replicating the data from the source file system into the destination file system.

* * * * *